(12) United States Patent
Oishi et al.

(10) Patent No.: US 11,599,762 B2
(45) Date of Patent: Mar. 7, 2023

(54) READING APPARATUS

(71) Applicant: TOSHIBA TEC KABUSHIKI KAISHA, Tokyo (JP)

(72) Inventors: Sadatoshi Oishi, Fuji Shizuoka (JP); Yuki Koike, Shimizu Sunto Shizuoka (JP); Sunao Tsuchida, Mishima Shizuoka (JP); Jun Yaginuma, Izunokuni Shizuoka (JP)

(73) Assignee: TOSHIBA TEC KABUSHIKA KAISHA, Tokyo (JP)

( * ) Notice: Subject to any disclaimer, the term of this patent is extended or adjusted under 35 U.S.C. 154(b) by 0 days.

(21) Appl. No.: 17/512,721

(22) Filed: Oct. 28, 2021

(65) Prior Publication Data
US 2022/0051066 A1 Feb. 17, 2022

Related U.S. Application Data

(63) Continuation of application No. 16/894,990, filed on Jun. 8, 2020, now abandoned, which is a continuation
(Continued)

(30) Foreign Application Priority Data

Feb. 7, 2018 (JP) .............................. JP2018-020418

(51) Int. Cl.
*G06Q 20/20* (2012.01)
*G06Q 20/32* (2012.01)
(Continued)

(52) U.S. Cl.
CPC .......... *G06K 19/0723* (2013.01); *A47F 9/048* (2013.01); *G06K 7/0008* (2013.01);
(Continued)

(58) Field of Classification Search
CPC .......... G06K 19/0722; G06K 19/0723; G06K 19/07309; G06K 19/07773; G06K 7/0008;
(Continued)

(56) References Cited

U.S. PATENT DOCUMENTS

| 5,530,702 A | 6/1996 | Palmer et al. |
| 2005/0077353 A1 | 4/2005 | Oishi et al. |

(Continued)

FOREIGN PATENT DOCUMENTS

| EP | 3454309 | 3/2019 |
| JP | 2006-048599 | 2/2006 |

(Continued)

OTHER PUBLICATIONS

Japanese Office Action for Japanese Patent Application No. 2018-025092 dated Dec. 7, 2021.
(Continued)

*Primary Examiner* — Tuyen K Vo
(74) *Attorney, Agent, or Firm* — Amin, Turocy & Watson, LLP

(57) ABSTRACT

According to one embodiment, a reading apparatus includes a shielding body, an antenna, and a reader and writer. The shielding body is formed in a box shape with an upper opening, to place an accommodating body and to shield radio waves. The antenna is provided in the shielding body to receive information from an RFID tag attached to a product that is passing through the opening. The reader and writer is connected to the antenna to read information of the product from the information received by the antenna.

20 Claims, 8 Drawing Sheets

Related U.S. Application Data of application No. 16/233,180, filed on Dec. 27, 2018, now abandoned.

(51) Int. Cl.
| | |
|---|---|
| *G06K 19/07* | (2006.01) |
| *G06K 7/00* | (2006.01) |
| *G06K 19/073* | (2006.01) |
| *G06K 19/077* | (2006.01) |
| *A47F 9/04* | (2006.01) |
| *G07G 1/00* | (2006.01) |
| *A47F 10/00* | (2006.01) |

(52) U.S. Cl.
CPC . *G06K 19/07309* (2013.01); *G06K 19/07773* (2013.01); *G06Q 20/20* (2013.01); *G06Q 20/3278* (2013.01); *G07G 1/009* (2013.01); *A47F 2010/005* (2013.01)

(58) Field of Classification Search
CPC .. G06K 7/10881; G06Q 10/087; G06Q 20/20; G06Q 20/3278; A47F 2010/005; A47F 9/048; G07G 1/009
See application file for complete search history.

(56) References Cited

U.S. PATENT DOCUMENTS

| | | | |
|---|---|---|---|
| 2006/0076406 A1 | 4/2006 | Ulrich et al. | |
| 2006/0097047 A1 | 5/2006 | Oishi et al. | |
| 2006/0185935 A1 | 8/2006 | Tashiro | |
| 2006/0187061 A1 | 8/2006 | Colby | |
| 2006/0208072 A1 | 9/2006 | Ku et al. | |
| 2006/0214834 A1 | 9/2006 | Baharav et al. | |
| 2010/0182132 A1 | 7/2010 | Sano et al. | |
| 2012/0299703 A1 | 11/2012 | Chen | |
| 2013/0126611 A1* | 5/2013 | Kangas | G06K 7/10178 235/385 |
| 2014/0060712 A1 | 3/2014 | Beckley | |
| 2014/0158772 A1 | 6/2014 | Bouveresse | |
| 2015/0127362 A1 | 5/2015 | DeBusk et al. | |
| 2015/0302228 A1 | 10/2015 | Hirono | |
| 2015/0332209 A1 | 11/2015 | DeBusk et al. | |
| 2017/0372562 A1 | 12/2017 | Terahara et al. | |
| 2018/0269572 A1 | 9/2018 | Oishi | |
| 2018/0314864 A1 | 11/2018 | Komaki | |
| 2019/0172296 A1* | 6/2019 | Zhang | G07G 1/0045 |
| 2019/0188428 A1* | 6/2019 | Ono | G07G 1/00 |
| 2019/0340855 A1 | 11/2019 | Clouser et al. | |

FOREIGN PATENT DOCUMENTS

| | | |
|---|---|---|
| JP | 2013-012002 | 1/2013 |
| JP | 2015-207118 | 11/2015 |

OTHER PUBLICATIONS

Chinese Office Action for Chinese Patent Application No. 201910012537.2 dated Dec. 14, 2021.
Japanese Office Action for Japanese Patent Application No. 2018-020425 dated Jan. 4, 2022.
Extended European Search Report for European Patent Application No. 19154712.4 dated Jun. 6, 2019.
Sheokand, et al. "Transparent broadband metamaterial absorber based on resistive films", Journal of Applied Physics, American Institute of Physics, US, vol. 122, No. 10, Sep. 11, 2017.
Non-Final Office Action for U.S. Appl. No. 16/233,180 dated Nov. 8, 2019.
Final Office Action for U.S. Appl. No. 16/233,180 dated Mar. 16, 2020.
European Office Action for European Patent Application No. 19154712.4 dated Jun. 16, 2020.
European Office Action for European Patent Application No. 19154712.4 dated Oct. 23, 2020.
Non-Final Office Action for U.S. Appl. No. 16/894,990 dated Apr. 16, 2021.
Final Office Action for U.S. Appl. No. 16/894,990 dated Jul. 28, 2021.
Japanese Office Action for Japanese Patent Application No. 2018-020418 dated Oct. 19, 2021.

\* cited by examiner

READING APPARATUS

CROSS-REFERENCE TO RELATED APPLICATIONS

This application is a Continuation of U.S. application Ser. No. 16/894,990, filed on Jun. 8, 2020, which is a Continuation of U.S. application Ser. No. 16/233,180, filed on Dec. 27, 2018, the entire contents of both of which are incorporated herein by reference.

This application is based upon and claims the benefit of priority from Japanese Patent Application No. P2018-020418, filed on Feb. 7, 2018, the entire contents of which are incorporated herein by reference.

FIELD

Embodiments described herein relate generally to a reading apparatus.

BACKGROUND

In the related art, a reading apparatus is known that reads product information from an RFID tag attached to a product and performs sales registration and checkout processing based on the product information. For example, an apparatus is proposed that collectively reads product information by placing products or a shopping basket that holds products on an upper surface of a checkout counter in which a planar antenna is embedded.

Recently, a shop is also known that employs a sales form in which a reading apparatus called a self-checkout apparatus, a self-checkout point-of-sales (POS) apparatus, or a self-registration apparatus is provided for a customer himself or herself to perform sales registration and checkout processing of products to be purchased. Therefore, when a customer himself or herself performs sales registration and checkout processing, the use of a reading apparatus that reads a plurality of RFID tags attached to products using an RFID reader and writer through an antenna can also be considered.

However, in this reading apparatus, after the completion of checkout processing, operations of taking out the shopping basket from the apparatus, taking out the products from the shopping basket, and then repacking the products with an accommodating body such as a carrier bag or a basket are necessary.

DETAILED DESCRIPTION

An exemplary embodiment provides a reading apparatus that reads an RFID tag and can perform sales registration and the accommodation in an accommodating body simultaneously.

In general, according to one embodiment, a reading apparatus includes a shielding body, an antenna, and a reader and writer. The shielding body is formed in a box shape with an upper opening to place an accommodating body and to shield radio waves. The antenna is provided in the shielding body to receive information from an RFID tag attached to a product that is passing through the opening. The reader and writer is connected to the antenna to read information of the product from the information received by the antenna.

First Embodiment

Figure 1:
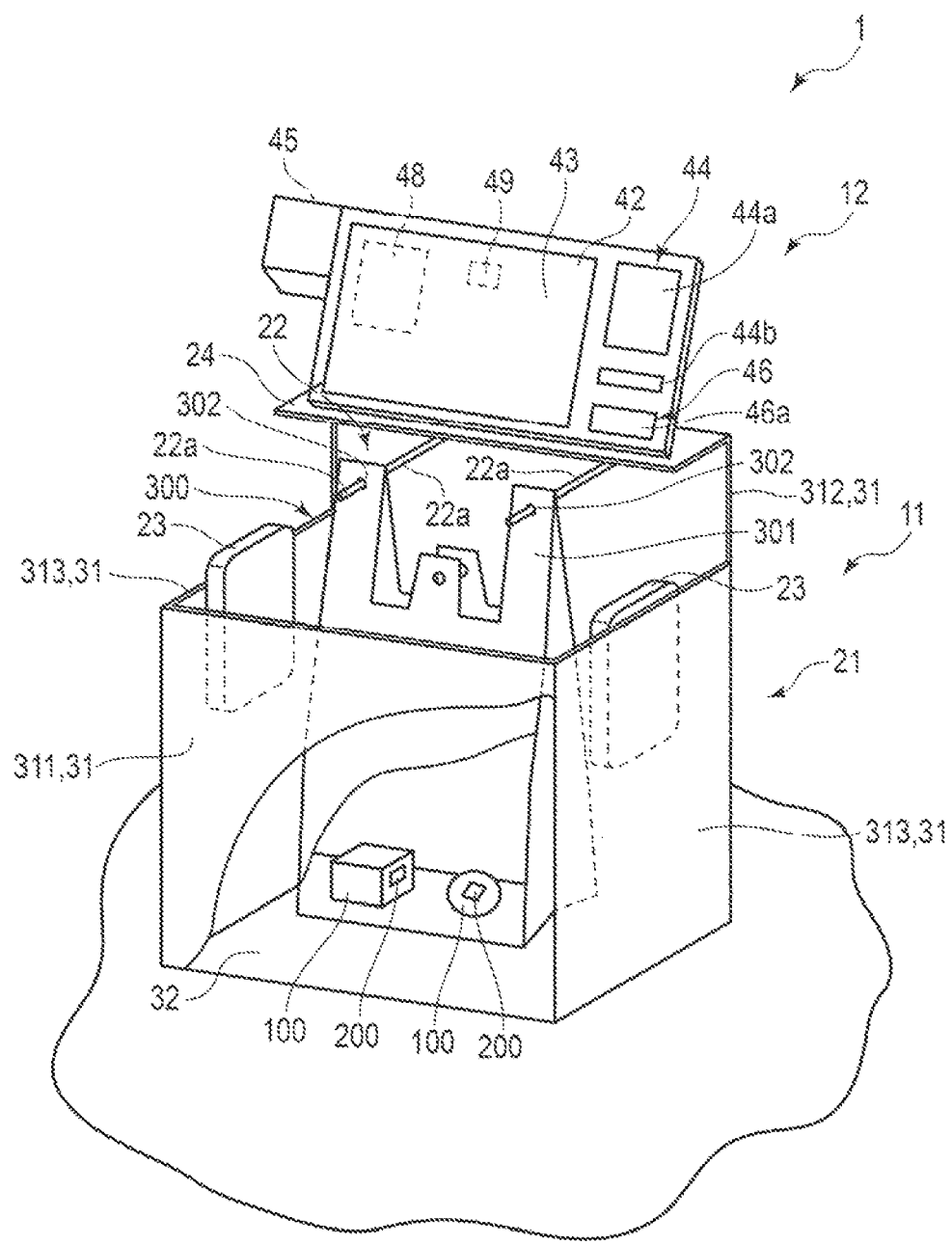
FIG. 1 is a perspective view illustrating a configuration of a reading apparatus according to a first embodiment.
Figure 2:
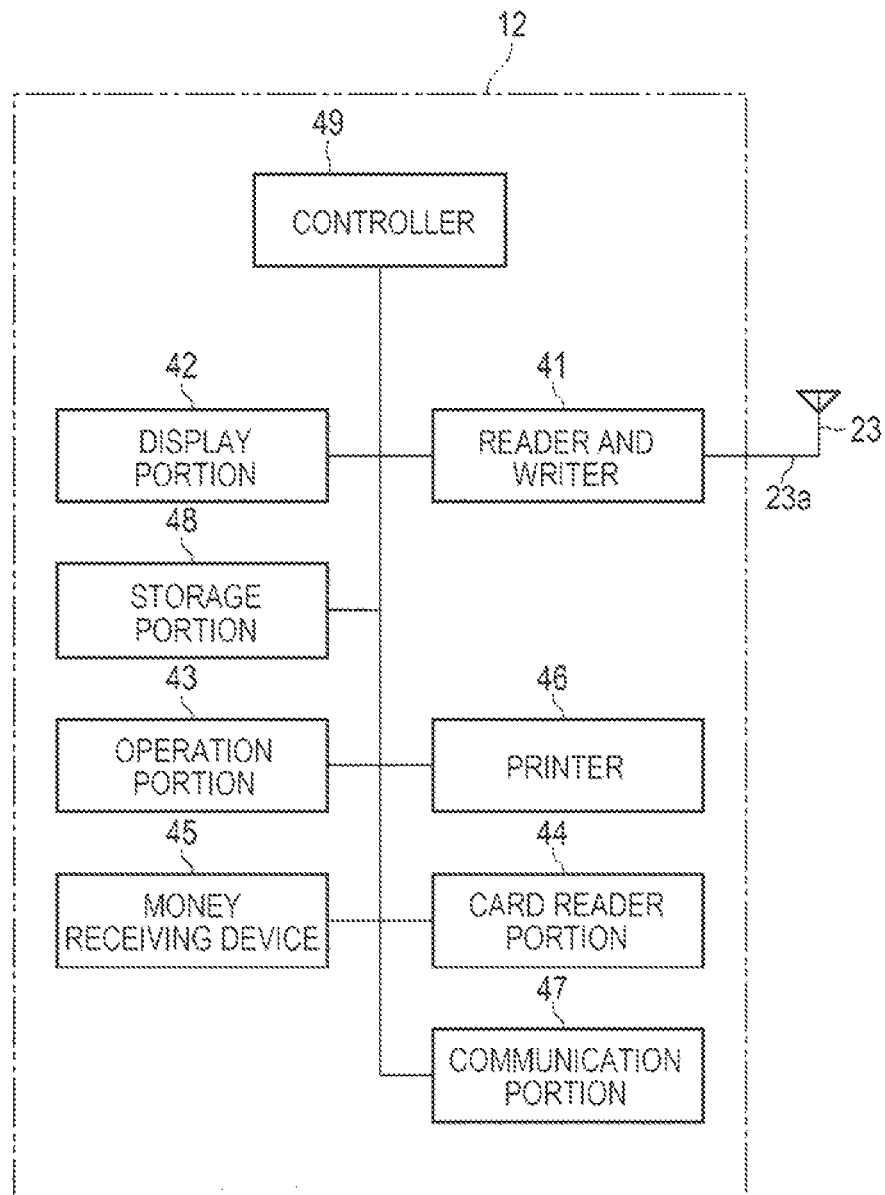
FIG. 2 is a block diagram illustrating the configuration of the reading apparatus.
Figure 3:
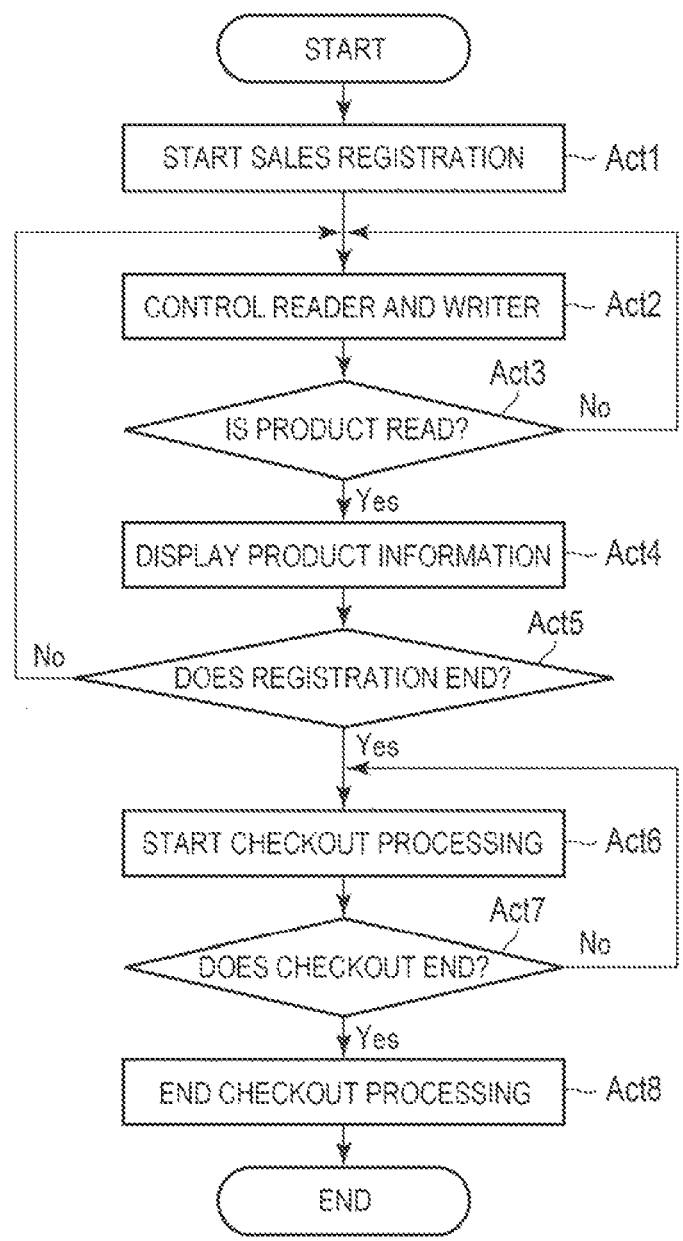
FIG. 3 is a flowchart illustrating a method of using the reading apparatus.

Hereinafter, a reading apparatus 1 according to a first embodiment will be described with reference to FIGS. 1 to 3. FIG. 1 is a perspective view illustrating a configuration of the reading apparatus 1 according to the first embodiment. FIG. 2 is a block diagram illustrating the configuration of the reading apparatus 1. FIG. 3 is a flowchart illustrating a method of using the reading apparatus 1.

As illustrated in FIG. 1, the reading apparatus 1 includes a main body 11 and a terminal 12. The reading apparatus 1 reads an RFID tag 200 of a product 100 by the main body 11 and performs sales registration and checkout processing based on the information of the RFID tag 200 read by the terminal 12. In addition, in the reading apparatus 1, when the RFID tag 200 is read by the main body 11, the product 100 with the RFID tag 200 attached thereto can be accommodated in an accommodating body 300 provided in the main body 11. The reading apparatus 1 is used as, for example, a self-checkout point-of-sales (POS) apparatus that allows a customer himself or herself to perform sales registration and checkout processing.

Here, when the reading apparatus 1 is provided in a shop such as a convenience store, the product 100 is an article that is sold in the store. In addition, the RFID tag 200 is attached to the product 100 in advance, and information of the product 100 is stored in a master of an external device connected to the terminal 12.

In addition, the RFID tag 200 stores the information of the product 100 and is configured to be readable and writable. The RFID tag 200 is, for example, a passive tag without a battery and is configured to be operable in a UHF band.

In addition, the accommodating body 300 is, for example, a shopping bag including a handle portion that is so-called a carrier bag or an accommodating case that is so-called my basket or a basket. In the embodiment, the accommodating body 300 is, for example, a polypropylene bag including a handle portion 301. Hereinafter, the accommodating body 300 will be described as a bag 300. In the bag 300, a pair of hole portions 302 are provided in the handle portion 301.

As illustrated in FIG. 1, the main body 11 includes a shielding body 21, a bag hanger 22, an antenna 23, and a fixing portion 24.

The shielding body 21 is formed in a rectangular box shape with an upper opening. The shielding body 21 shields, for example, a radio wave radiated from the antenna 23 or radio waves transmitted from the RFID tag 200 outside the main body 11. In addition, the shielding body 21 functions as an accommodating chamber that accommodates the product 100 and the accommodating body 300.

Specifically, the shielding body 21 is formed in a rectangular cylindrical shape including four side walls 31 with a rectangular plate shape and a bottom wall 32 with a rectangular plate shape. The four side walls 31 are integrally assembled in a rectangular cylindrical shape. The four side walls 31 shield a radio wave. In addition, the bag hanger 22 is provided on one side wall 31 of the shielding body 21.

Here, in the following description, the side wall 31 side where the bag hanger 22 is provided is set as a back surface side of the main body 11, a side wall 31 side facing the side wall 31 is set as a front surface side of the main body 11, and other side surface 31 sides facing each other are set as side surface sides of the main body 11. In addition, in the following description, the side wall 31 on the front surface side of the main body 11 is set as a first side wall 311, the side wall 31 on the back surface side of the main body 11 is set as a second side wall 312, and the pair of side walls 31 on the side surface sides of the main body 11 are set as a pair of side walls 313.

The second side wall 312 is configured to be higher than the other side walls 311 and 313. In the second side wall 312, the bag hanger 22 is provided at a position higher than upper ends of the other side walls 311 and 313, and the fixing portion 24 is provided to be integrated with an upper surface thereof.

Upper ends of the first side wall 311 and the third side walls 313 and an inner surface of the second side wall 312 form the upper opening of the shielding body 21. Here, the upper opening of the shielding body 21 has a dimension in which the bag 300, the product 100, and the bag 300 with the product 100 accommodated therein can pass through the opening.

The bottom wall 32 closes lower ends of the four side walls 31. The bottom wall 32 may be configured to be capable of shielding radio waves.

For example, the shielding body 21 has a configuration in which the four side walls 31 and the bottom wall 32 are formed of a transparent resin material and a transparent film or the like that shield radio waves is adhered to at least the four side walls 31. The shielding body 21 may be formed of, for example, a metal material that shields radio waves, or may be formed using a mesh-like metal plate that shields radio waves or the like at a specific frequency transmitted from the antenna 23 and the RFID tag 200. However, it is preferable that the shielding body 21 is configured such that the inside thereof is visually recognizable.

The bag hanger 22 is fixed to the second side wall 312 at a position above the opening of the shielding body 21. The bag hanger 22 is formed with, for example, a pair of iron rods 22a that are elongated in one direction and can be disposed in the hole portions 302 of the bag 300. The pair of rods 22a can be inserted into the pair of hole portions 302 of the bag 300 at the same positions in the height direction. In addition, the pair of rods 22a are disposed on the second side wall 312 at a sufficiently large interval at which the product 100 can be inserted into the opening of the bag 300. Further, the pair of rods 22a hold the bag 300, and the length thereof is appropriately set such that when the bag 300 with the product 100 accommodated therein is taken out from the opening of the shielding body 21, the operation is not interrupted.

The bag hanger 22 holds the bag 300 by being disposed in the hole portions 302 of the bag 300. In addition, the bag hanger 22 holds the bag 300 at a position where the height of the opening of the bag 300 is the same as that of the opening of the shielding body 21 or at a position where the height of the opening of the bag 300 is slightly higher or lower than that of the opening of the shielding body 21.

For example, the antenna 23 is provided in the opening of the shielding body 21 and on an inner surface of the shielding body 21. That is, the antenna 23 is provided at a position where the reading and writing of the RFID tag 200 of the product 100 can be performed when the product 100 is moved from the opening of the shielding body 21 to the opening of the bag 300. For example, two antennas 23 are provided at positions of the upper ends of the pair of third side walls 313, respectively, that are the same positions as the opening position of the bag 300 hung in the bag hanger 22 or positions slightly higher than the opening position. The antenna 23 is, for example, a planar patch antenna formed in a rectangular plate shape. The antenna 23 is connected to the terminal 12 through a coaxial cable 23a. The antenna 23 radiates radio waves toward the opening of the bag 300 of the shielding body 21 and the inside of the bag 300.

The fixing portion 24 disposes and fixes the terminal 12. For example, the fixing portion 24 is a plate-shaped member with one end provided at the upper end of the second side wall 312, which extends toward the first side wall 311 side in a direction perpendicular to a main surface direction of the second side wall 312. The fixing portion 24 is not particularly limited to this configuration and may have another configuration as long as the fixing portion 24 can fix the terminal 12.

The terminal 12 includes a reader and writer 41, a display portion 42, an operation portion 43, a card reader portion 44, a money receiving device 45, a printer 46, a communication portion 47, a storage portion 48, and a controller 49.

The reader and writer 41 is electrically connected to the antenna 23 through the coaxial cable 23a. The reader and writer 41 has a function of reading information of the RFID tag 200 through the antenna 23 and a function of writing information on the RFID tag 200 through the antenna 23. The reader and writer 41 may be provided in the main body 11 instead of the terminal 12 and may be connected to the controller 49 through a signal line or the like.

The display portion 42 is, for example, a liquid crystal display. The display portion 42 displays, for example, information from the reader and writer 41, information of the storage portion 48, and the information of the product 100 that is stored in a master or the like of an external terminal and provided through the communication portion 47. For example, the display portion 42 displays information regarding the product 100, information regarding settlement, and information regarding an input or an operation of the terminal.

The operation portion 43 is an input device through which an operator of the reading apparatus 1 inputs information such as an external instruction. The operation portion 43 is, for example, a touch panel provided in the display portion 42. The operation portion 43 transmits the input information to the controller 49.

For example, the card reader portion 44 includes a first card reader portion 44a that reads a non-contact IC card and a second card reader portion 44b that reads a contact IC card, a magnetic card, or the like. The card reader portion 44 transmits the read card information to the controller 49. Here, examples of the card include a credit card, a prepaid card, and a card capable of payment of electronic money.

The money receiving device 45 processes money received from the operator. For example, the money receiving device 45 is a so-called automatic change machine including a coin insertion port, a coin discharge port, a bill insertion port, and a bill discharge port. The money receiving device 45 is configured to transmit money information to the controller 49.

The printer 46 outputs a receipt on which information of a settled product is printed. The printer 46 includes a receipt discharge port 46a for discharging the receipt.

The communication portion 47 is a communication interface that is configured to communicate with an external device. The communication portion 47 transmits the product information acquired by the reader and writer 41 to an external device and receives product information and the like required for settlement.

The storage portion 48 stores a program executed by the controller 49, information of sales registration, information of checkout processing, and the like. For example, the storage portion 48 includes a read only memory (ROM) for storing a control program that stores a program or the like and a random access memory (RAM) for storing data that temporarily stores information when the controller 49 executes a program.

The controller 49 is, for example, a central processing unit (CPU). The controller 49 executes various controls and processing functions by executing programs stored in the storage portion 48. The controller 49 is electrically connected to the reader and writer 41, the display portion 42, the operation portion 43, the card reader portion 44, the money receiving device 45, the printer 46, the communication portion 47, and the storage portion 48, and controls each component using programs stored in the storage portion 48. For example, the controller 49 controls the reader and writer 41 such that the information of the RFID tag 200 is read through the antenna 23 and information is written on the RFID tag 200. In addition, the controller 49 controls the display portion 42, the card reader portion 44, the money receiving device 45, and the communication portion 47 to perform sales registration and checkout processing.

Next, a method of using the reading apparatus 1 will be described with reference to a flowchart of FIG. 3.

The operator such as a customer operates the operation portion 43 by touching a region for inputting the start of checkout processing that is displayed on the display portion 42 to input an instruction of the start of sales registration of the product 100 (Act 1). Next, the operator hangs the bag 300 on the bag hanger 22 and widens the opening of the bag 300. For example, at this time, the controller 49 may cause the display portion 42 to display the hanging of the bag 300 on the bag hanger 22.

When the controller 49 receives information of the instruction of the start of checkout processing from the operation portion 43, the controller 49 controls the reader and writer 41 (Act 2) to radiate the radio waves from the antenna 23 and to start the reading of the RFID tag 200 (Act 3). When the operator moves the product 100 accommodated in the shopping basket to the bag 300, the reader and writer 41 reads the product information stored in the RFID tag 200, which is passing through the opening of the shielding body 21, through the antenna 23 (YES in Act 3). The controller 49 queries database of the product 100 stored in the master or the like of the external device about the information of the RFID tag 200 read by the reader and writer 41 through the communication portion 47, receives information of the product 100 such as a product name or a price associated with the information of the RFID tag 200, and displays the information of the product 100 (Act 4). In addition, the controller 49 performs sales registration to store the information in the storage portion 48, and controls the reader and writer 41 to write a registration completion flag on the read RFID tag 200.

Here, the registration completion flag is information indicating that the product is settled, and is written to prevent the product from being erroneously taken out from the shop without settlement. Whether or not the registration completion flag is written is determined by the RFID tag 200 being read at the gate installed at an entrance of the shop. When the RFID tag 200 on which the registration completion flag is not written is present, a warning is generated by a notification unit such as a buzzer.

When the controller 49 does not read the RFID tag 200 (No in Act 3) after starting the reading of the RFID tag 200 (Act 3), the controller 49 continuously controls the reader and writer 41 (Act 2). In addition, when the controller 49 fails to read the RFID tag 200 (No in Act 3) after starting the reading of the RFID tag 200 (Act 3), for example, the controller 49 may cause the display portion 42 to display a guide such that the product 100 is taken out of the bag 300 to pass through the opening of the shielding body 21 again, and may continuously control the reader and writer 41 (Act 2).

Next, the controller 49 checks whether or not sales registration ends from the operation portion 43 (Act 5). As a specific example, the controller 49 controls the display portion 42 and the operation portion 43 to display a display for inputting an instruction of the end of sales registration, and enables to operate the operation portion 43 in the region.

When the sales registration of all the products 100 to be purchased does not end and the instruction of the end of sales registration is not input (No in Act 5), the controller 49 returns to Act 2 and controls the reader and writer 41 again. After the end of the reading of the product 100, the operator takes out the next product 100 from the shopping basket, and moves all the products 100 accommodated in the shopping basket to the bag 300, and performs sales registration.

When the operator accommodates all the products 100 to be purchased in the bag 300 and operates the operation portion 43, the controller 49 receives the instruction of the end of sales registration (YES in Act 5), ends sales registration, and starts checkout processing (Act 6). As a specific example, the controller 49 stops the reader and writer 41 and controls the display portion 42 to display information such as names or a total price of the products 100 and a settlement method on the display portion 42, and controls the operation portion 43 to enable to input a settlement method. In addition, the controller 49 controls the card reader portion 44 or the money receiving device 45 based on the settlement method selected by the operator by operating the operation portion 43 to enable checkout through card settlement or cash settlement (Act 7).

When checkout ends through card settlement or cash settlement (YES in Act 7), the controller 49 ends checkout processing (Act 8) and controls the display portion 42 to display information of the end of checkout processing on the display portion 42. At this time, the controller 49 controls the reader and writer 41 to write the registration completion flag on the RFID tag 200.

In addition, when checkout does not end (No in Act 7), the controller 49 controls the display portion 42, the operation portion 43, the card reader portion 44, and the money receiving device 45 to maintain a state where the settlement method is selectable.

According to the reading apparatus 1 having the above-described configuration, the bag 300 that is an accommodating body accommodating the product 100 is accommodated in the shielding body 21, the function of shielding radio waves is imparted to the shielding body 21, and the antenna 23 is provided in the opening of the upper end of the shielding body 21. With this configuration, when the product 100 having the RFID tag 200 is put into the bag 300 in the shielding body 21, the RFID tag 200 is read by the antenna 23. Therefore, the reading apparatus 1 can accommodate the product 100 in the bag 300 while performing sales registration. In addition, the reading apparatus 1 can be prevent the RFID tag 200 present outside the shielding body 21 from being erroneously read and written.

With the reading apparatus 1 according to the embodiment, sales registration and the accommodation of the product in the accommodating body 300, that is, the packing of the product with the bag 300 can be simultaneously performed.

Second Embodiment

Next, a reading apparatus 1A according to a second embodiment will be described with reference to FIG. 4. Among components of the reading apparatus 1A according to the second embodiment, the same components as those of the reading apparatus 1 according to the first embodiment described above will be represented by the same reference numerals, and the detailed description thereof will be omitted.

Figure 4:
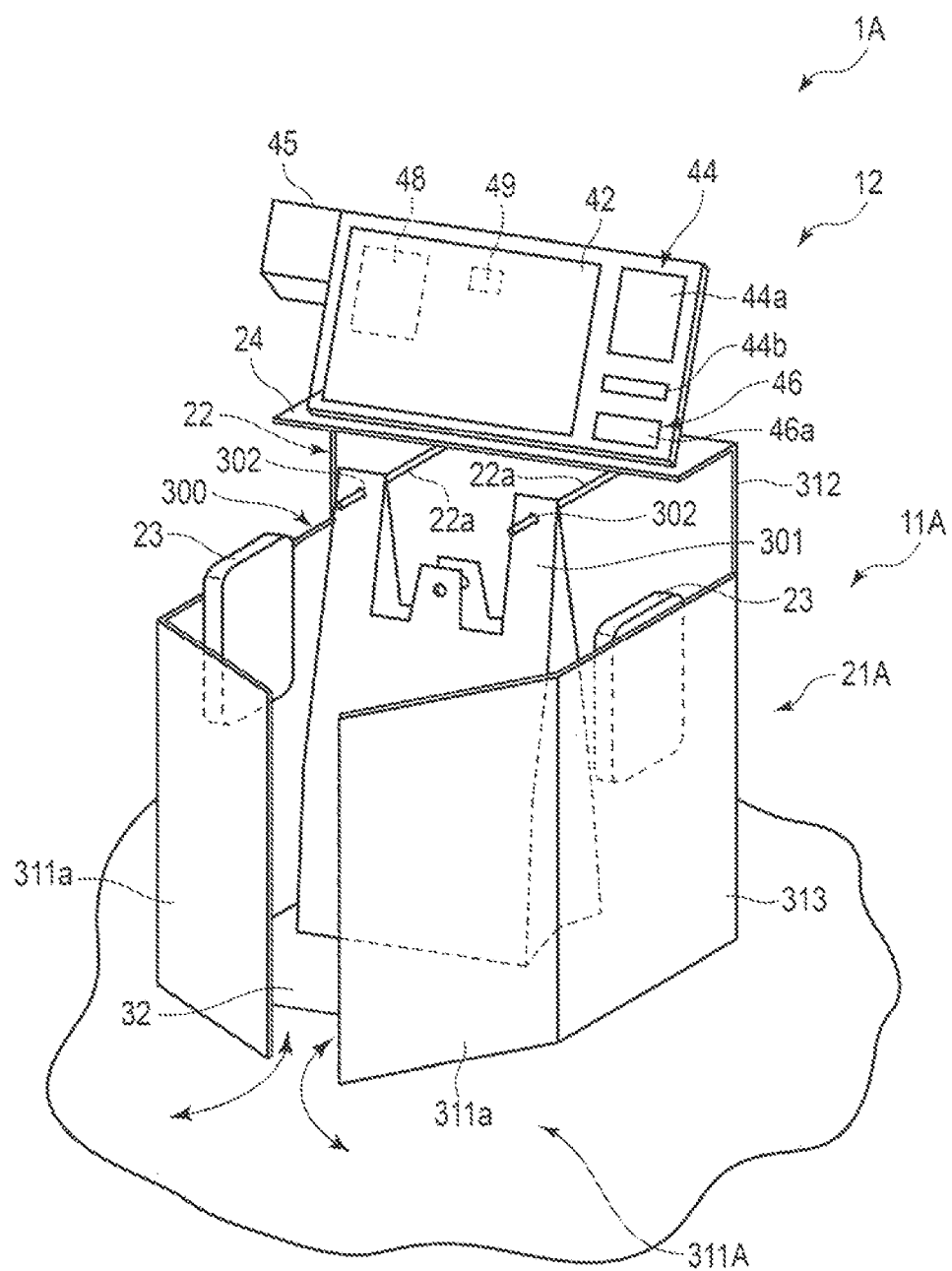
FIG. 4 is a perspective view illustrating a configuration of a reading apparatus according to a second embodiment.

As illustrated in FIG. 4, the reading apparatus 1A includes a main body 11A and the terminal 12. As illustrated in FIG. 4, the main body 11A includes a shielding body 21A, the bag hanger 22, the antenna 23, and the fixing portion 24. That is, the configuration of the main body 11A is different from that of the main body 11 according to the first embodiment in the configuration of the shielding body 21A.

The shielding body 21A has a rectangular box shape with an upper opening and is configured to be capable of opening or closing a first side wall 311A on the front surface side. As a specific example, in the shielding body 21A, the first side wall 311A includes a pair of side wall portions 311a and 311a. This first side wall 311A has a so-called double-door opening structure, and open or close the front surface side of the shielding body 21A. That is, in the shielding body 21A, the bag 300 as an accommodating body can pass through the front surface side of the shielding body 21A, that is, the bag 300 can be taken out from the front surface side of the shielding body 21A by opening the first side wall 311A that is a part of the side walls, and the passage of the bag 300 can be restricted by closing the first side wall 311A.

The length of the side wall portions 311a in the width direction is set to be half of the distance between the pair of third side walls 313. One of the side wall portions 311a is rotatably connected to an end portion on the front surface side of one third side wall 313 through a hinge portion. The other one of the side wall portions 311a is rotatably connected to an end portion on the front surface side of the other third side wall 313 through a hinge portion. The hinge portion has a function of rotatably holding the side wall portion 311a with respect to the third side wall 313 and includes a spring that biases the pair of side wall portions 311a in a closing direction and a damper that alleviates the rotation speed of the side wall portions 311a or maintains a state where the side wall portions 311a are open.

With the reading apparatus 1A having the above-described configuration, sales registration and the accommodation of the product in the bag 300, that is, the packing can be simultaneously performed as in the above-described reading apparatus 1. Further, in the reading apparatus 1A, since the front surface side of the shielding body 21A can be opened and closed, the operation of hanging the bag 300 on the bag hanger 22 and the operation of taking out the bag 300 with the product 100 accommodated therein after sales registration and checkout processing can be easily performed, and the usability is high.

Third Embodiment

Next, a reading apparatus 1B according to a third embodiment will be described with reference to FIG. 5. Among components of the reading apparatus 1B according to the third embodiment, the same components as those of the reading apparatus 1 according to the first embodiment described above will be represented by the same reference numerals, and the detailed description thereof will be omitted.

Figure 5:
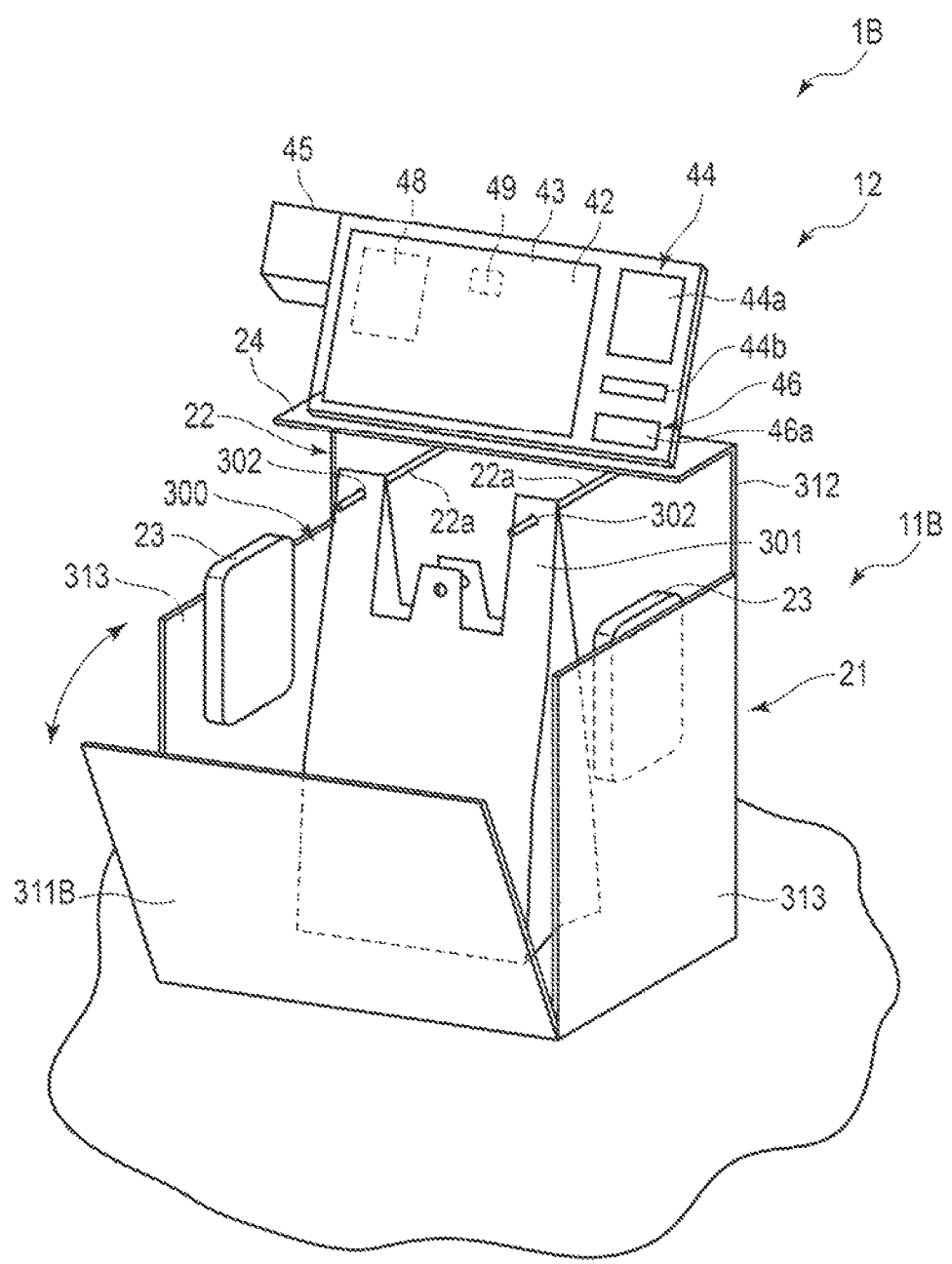
FIG. 5 is a perspective view illustrating a configuration of a reading apparatus according to a third embodiment.

As illustrated in FIG. 5, the reading apparatus 1B includes a main body 11B and the terminal 12. As illustrated in FIG. 5, the main body 11B includes a shielding body 21B, the bag hanger 22, the antenna 23, and the fixing portion 24. That is, the configuration of the main body 11B is different from that of the main body 11 according to the first embodiment in the configuration of the shielding body 21B.

The shielding body 21B has a rectangular box shape with an upper opening, and is configured to be capable of opening or closing a first side wall 311B on the front surface side. As a specific example, the first side wall 311B is rotatably connected to an end portion on the front surface side of the bottom wall 32 through a hinge portion.

The hinge portion has a function of rotatably holding the first side wall 311B with regard to the bottom wall 32, and includes a spring that biases the first side wall 311B in a closing direction and a damper that alleviates the rotation speed of the first side wall 311B or maintains a state where the first side wall 311B is open.

With the reading apparatus 1B having the above-described configuration, sales registration and the accommodation of the product in the bag 300, that is, the packing can be simultaneously performed as in the above-described reading apparatuses 1 and 1A. Further, in the reading apparatus 1B, since the front surface side of the shielding body 21B can be opened and closed, the operation of hanging the bag 300 on the bag hanger 22 and the operation of taking out the bag 300 with the product 100 accommodated therein after sales registration and checkout processing can be easily performed, and the usability is high.

Fourth Embodiment

Next, a reading apparatus 1C according to a fourth embodiment will be described with reference to FIG. 6. Among components of the reading apparatus 1C according to the fourth embodiment, the same components as those of the reading apparatus 1 according to the first embodiment described above will be represented by the same reference numerals, and the detailed description thereof will be omitted.

Figure 6:
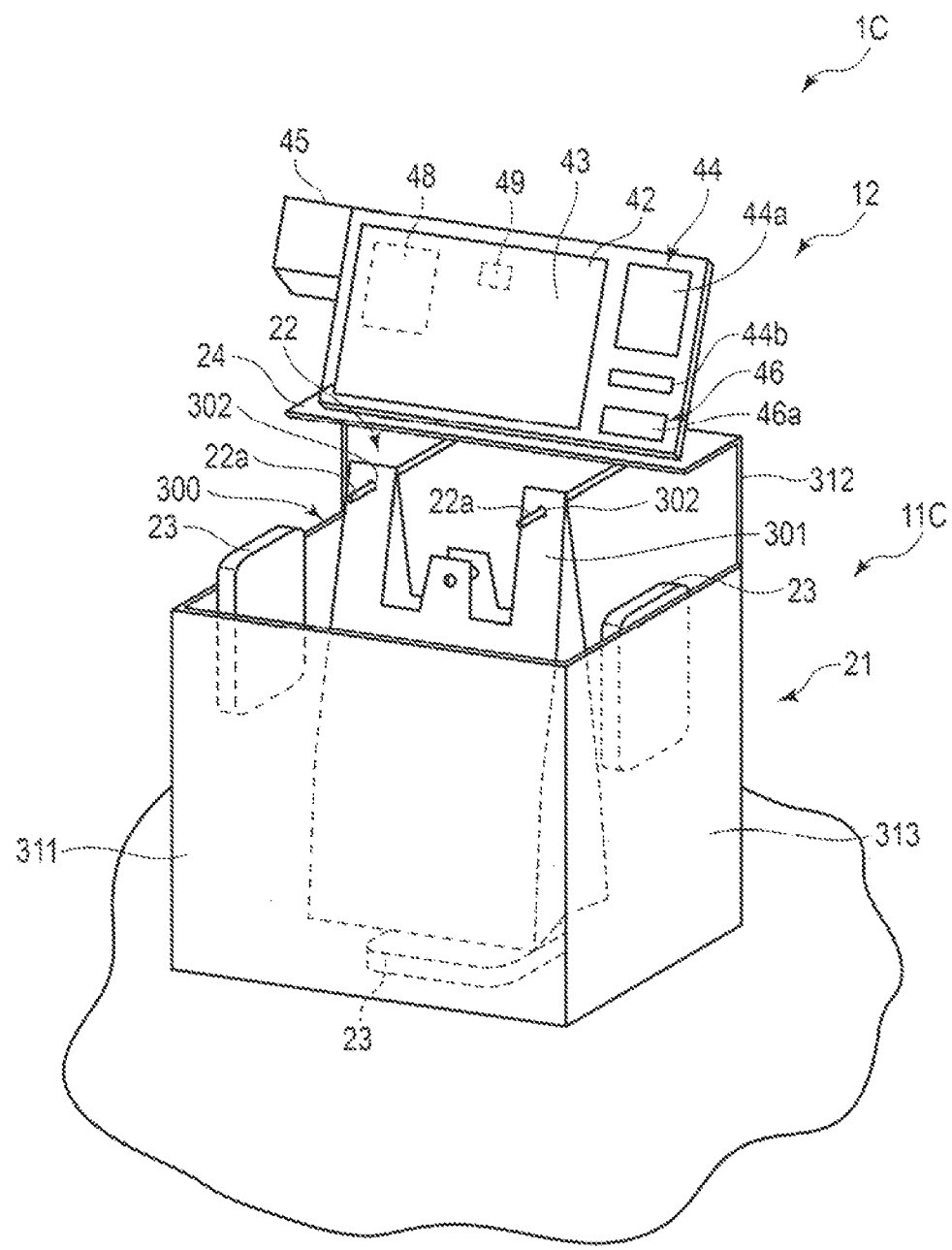
FIG. 6 is a perspective view illustrating a configuration of a reading apparatus according to a fourth embodiment.

As illustrated in FIG. 6, the reading apparatus 1C includes a main body 11C and the terminal 12. As illustrated in FIG. 6, the main body 11C includes the shielding body 21, the bag hanger 22, three antennas 23, and the fixing portion 24. That is, the main body 11C is different from the main body 11 according to the first embodiment in the number of antennas 23.

In the main body 11C, three antennas 23 are provided. Among the three antennas 23, two antennas 23 are provided on the upper end of the shielding body 21 as in the case of the pair of antennas 23 of the main body 11. In addition, the remaining one antenna 23 is provided on the bottom wall 32. The antenna 23 provided on the bottom wall 32 may be configured to be capable of scanning the bottom wall 32 in a horizontal direction such that the RFID tag 200 is readable over a wide range of upper areas from the bottom wall 32.

With the reading apparatus 1C having the above-described configuration, sales registration and the accommodation of the product in the bag 300, that is, the packing can be simultaneously performed as in the above-described reading apparatus 1. Further, by providing the antenna 23 also on the bottom wall 32, the occurrence of read error of the RFID tag 200 in the shielding body 21 can be reduced.

Fifth Embodiment

Next, a reading apparatus 1D according to a fifth embodiment will be described with reference to FIG. 7. Among components of the reading apparatus 1D according to the fifth embodiment, the same components as those of the reading apparatus 1 according to the first embodiment described above will be represented by the same reference numerals, and the detailed description thereof will be omitted.

Figure 7:
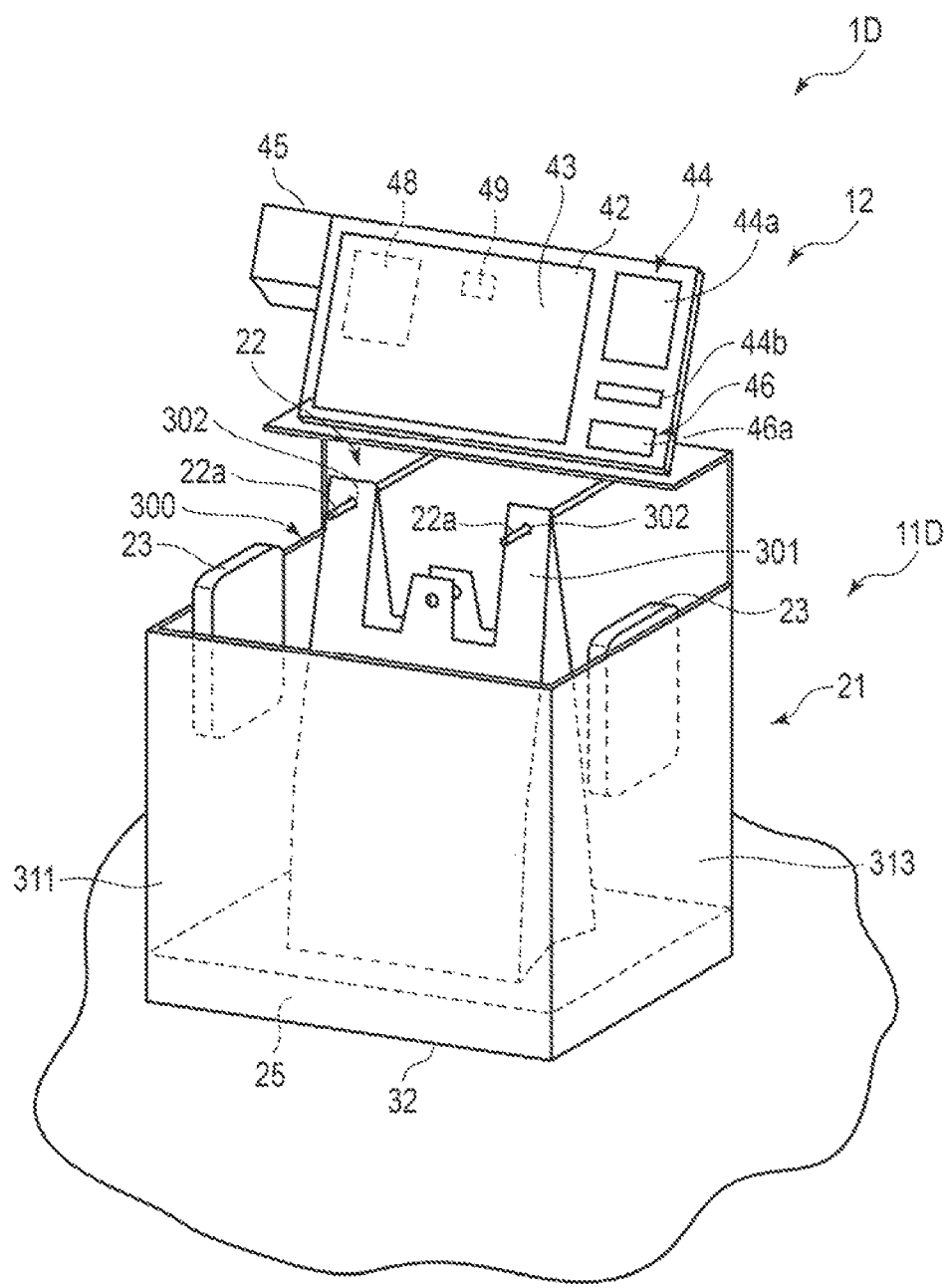
FIG. 7 is a perspective view illustrating a configuration of a reading apparatus according to a fifth embodiment.

As illustrated in FIG. 7, the reading apparatus 1D includes a main body 11D and the terminal 12. As illustrated in FIG. 7, the main body 11D includes the shielding body 21, the bag hanger 22, the antenna 23, the fixing portion 24, and a buffer material 25. That is, the configuration of the main body 11D is different from that of the main body 11 according to the first embodiment in that the buffer material 25 is included.

The buffer material 25 is provided on the upper surface of the bottom wall 32. The buffer material 25 covers the upper surface of the bottom wall 32, and absorbs impacts when the product 100 collides with the bottom wall 32 at the time of packing the product 100 with the bag 300.

With the reading apparatus 1D having the above-described configuration, sales registration and the accommodation of the product in the bag 300, that is, the packing can be simultaneously performed as in the above-described reading apparatus 1. Further, by providing the buffer material 25 on the bottom wall 32, even when the operator erroneously drops the product 100 on the bottom wall 32, the buffer material 25 can prevent the product 100 from being damaged.

Sixth Embodiment

Next, a reading apparatus 1E according to a sixth embodiment will be described with reference to FIG. 8. Among components of the reading apparatus 1E according to the sixth embodiment, the same components as those of the reading apparatus 1 according to the first embodiment described above will be represented by the same reference numerals, and the detailed description thereof will be omitted.

Figure 8:
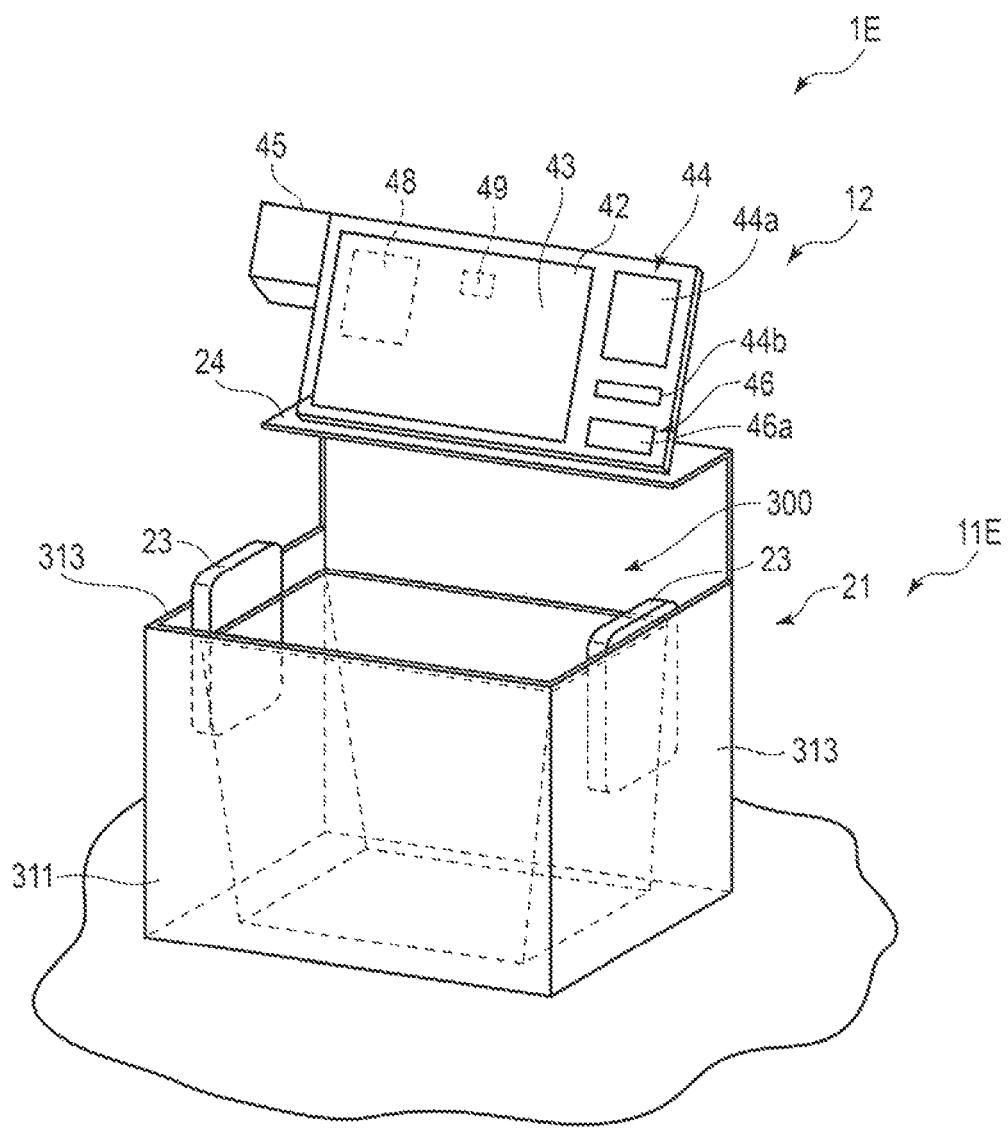
FIG. 8 is a perspective view illustrating a configuration of a reading apparatus according to a sixth embodiment.

As illustrated in FIG. 8, the reading apparatus 1E includes a main body 11E and the terminal 12. As illustrated in FIG. 8, the main body 11E includes a shielding body 21E, the antenna 23, and the fixing portion 24. That is, the configuration of the main body 11E is different from that of the main body 11 according to the first embodiment in that the bag hanger 22 is not included.

The shielding body 21E is formed in a rectangular box shape with an upper opening. In the shielding body 21E, the bag hanger 22 is not provided. Therefore, the shielding body 21E includes an opening capable of taking out an accommodating case 300 called my basket or a basket as an accommodating body 300 therethrough. The shielding body 21E may further include the bag hanger 22 such that the accommodating case 300 and the bag 300 can be selectively used.

With the reading apparatus 1E having the above-described configuration, sales registration and the accommodation of the product in the accommodating case 300 can be simultaneously performed as in the above-described reading apparatus 1. Further, by configuring the accommodating case 300 to be capable of being taken out, not only the bag 300 but also various accommodating bodies 300 that are brought by the operator can be used.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A reading apparatus, comprising:
a shielding body configured to shield radio waves, the shielding body is formed in a box shape with an upper opening through which to place an accommodating body, the shielding body comprises four rectangular plate-shaped side walls and a rectangular plate-shaped bottom wall;
an antenna provided in the upper opening at an upper end of the shielding body to receive information from an RFID tag attached to a product that is passing through the upper opening, at least a portion of the antenna is above the upper opening;
a hanger fixed above the opening of the shielding body and above the antenna to place and hold the accommodating body; and
a reader and writer connected to the antenna to read information of the RFID tag from the information received by the antenna,
wherein
the accommodating body is a bag that accommodates the product, and
the accommodating body includes a bag hanger that is disposed above the shielding body to hang the bag.

2. The reading apparatus according to claim 1, wherein a front wall of the shielding body is open such that the accommodating body passes through the front wall.

3. The reading apparatus according to claim 1, wherein a first portion of the antenna is above an upper edge of the shielding body at the upper opening, and a second portion of the antenna is inside the shielding body.

4. The reading apparatus according to claim 2, wherein the accommodating body is an accommodating case that accommodates the product.

5. The reading apparatus according to claim 1, further comprising a buffer material on a bottom surface of the shielding body.

6. The reading apparatus according to claim 1, wherein the shielding body has four side walls and a bottom wall.

7. The reading apparatus according to claim 1, wherein the shielding body comprises four side walls made of a transparent material.

8. The reading apparatus according to claim 1, wherein the shielding body comprises four side walls made of a radio wave shielding material.

9. The reading apparatus according to claim 1, wherein the box shape is a rectangular box shape.

10. A method for processing an RFID tag, comprising:

radiating the RFID tag attached to a product, the product within an accommodating body that accommodates the product, passing through an upper opening in an upper portion of a shielding body configured to shield radio waves formed in a box shape, the shielding body comprises four rectangular plate-shaped side walls and a rectangular plate-shaped bottom walls, wherein the accommodating body includes a bag hanger that is disposed above the shielding body and above an antenna, at least a portion of the antenna is above the upper opening, the bag hanger hangs a bag, the accommodating body shields radio waves; and receiving information from the RFID tag.

11. The method according to claim 10, further comprising:

reading product information from the RFID tag.

12. The method according to claim 10, further comprising:

writing registration completion information to the RFID tag.

13. A self-checkout POS apparatus, comprising:

a shielding body configured to shield radio waves formed in a box shape with an upper opening through which to place an accommodating body, wherein the shielding body comprises four rectangular plate-shaped side walls and a rectangular plate-shaped bottom wall;

an antenna provided in the upper opening at an upper end of the shielding body to receive information from an RFID tag attached to a product that is passing through the upper opening, at least a portion of the antenna is above the upper opening of the shielding body;

a hanger fixed above the upper opening of the shielding body and the antenna, the hanger holds the accommodating body inside the shielding body;

a reader and writer connected to the antenna to read information of the RFID tag from the information received by the antenna;

and a printer for providing a receipt, wherein the accommodating body is a bag that accommodates the product, and the accommodating body includes a bag hanger that is disposed above the shielding body to hang the bag.

14. The self-checkout POS apparatus according to claim 13, wherein a front wall of the shielding body is open such that the accommodating body passes through the front wall.

15. The self-checkout POS apparatus according to claim 13, wherein a first portion of the antenna is above an upper edge of the shielding body at the upper opening, and a second portion of the antenna is inside the shielding body.

16. The self-checkout POS apparatus according to claim 14, wherein the accommodating body is an accommodating case that accommodates the product.

17. The self-checkout POS apparatus according to claim 13, further comprising a buffer material on a bottom surface of the shielding body.

18. The self-checkout POS apparatus according to claim 13, wherein the shielding body has four side walls and a bottom wall.

19. The self-checkout POS apparatus according to claim 13, wherein the shielding body comprises four side walls made of a transparent material.

20. The self-checkout POS apparatus according to claim 13, further comprising a display to show transactions and a card reader to facilitate processing payment.

* * * * *